(12) United States Patent
Czechtizky

(10) Patent No.: US 11,077,738 B2
(45) Date of Patent: Aug. 3, 2021

(54) VEHICLE COMPONENT

(71) Applicant: Dr. Ing. h.c. F. Porsche Aktiengesellschaft, Stuttgart (DE)

(72) Inventor: Timo Czechtizky, Zell unter Aichelberg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 290 days.

(21) Appl. No.: 16/175,913

(22) Filed: Oct. 31, 2018

(65) Prior Publication Data

US 2019/0143791 A1     May 16, 2019

(30) Foreign Application Priority Data

Nov. 14, 2017 (DE) ...................... 10 2017 126 766.2

(51) Int. Cl.
  *B60H 1/24* (2006.01)
  *B60H 1/26* (2006.01)
  *B62D 25/10* (2006.01)
  *B62D 25/12* (2006.01)

(52) U.S. Cl.
  CPC ............ *B60H 1/244* (2013.01); *B60H 1/248* (2013.01); *B60H 1/26* (2013.01); *B62D 25/105* (2013.01); *B62D 25/12* (2013.01)

(58) Field of Classification Search
  CPC .......... B60H 1/244; B60H 1/248; B60H 1/26; B62D 25/105; B62D 25/12; B01D 45/08
  USPC ........................................................ 454/151
  See application file for complete search history.

(56) References Cited

U.S. PATENT DOCUMENTS

| | | | | |
|---|---|---|---|---|
| 1,400,860 A | * | 12/1921 | Brown ....................... | B63J 2/10 55/432 |
| 2,787,206 A | * | 4/1957 | Dustman .................. | B60H 1/26 454/151 |
| 2,796,014 A | * | 6/1957 | Montgomery ....... | B60H 1/3202 454/157 |
| 2,970,456 A | * | 2/1961 | Rice ..................... | B60H 1/3202 62/244 |
| 3,638,552 A | * | 2/1972 | Dettloff .................... | B60H 1/26 454/141 |

(Continued)

FOREIGN PATENT DOCUMENTS

| | | |
|---|---|---|
| DE | 708 846 | 7/1941 |
| DE | 2 050 020 | 2/1972 |

(Continued)

OTHER PUBLICATIONS

Conen, et al., WO 91/12974 A1 English machine translation, Sep. 5, 1991 (Year: 1991).*

(Continued)

*Primary Examiner* — Kenneth J Hansen
*Assistant Examiner* — Phillip Decker
(74) *Attorney, Agent, or Firm* — Gerald E. Hespos; Michael J. Porco; Matthew T. Hespos

(57) ABSTRACT

A vehicle component (1) has a lid (2) for closing a trunk (102). The lid (2) has an air duct opening (3) for letting in and/or letting out an air flow to or from an air duct (4). The air duct opening (3) has a visual screen installation (5) with two visual screen elements (15, 25) formed with passage openings (6). The passage openings (6) are disposed to be mutually offset so that a view into the air duct opening (3) is restricted.

11 Claims, 3 Drawing Sheets

(56) References Cited

U.S. PATENT DOCUMENTS

| | | | | |
|---|---|---|---|---|
| 3,945,812 A * | 3/1976 | Doane | ................... | B01D 45/08 |
| | | | | 95/272 |
| 4,558,634 A * | 12/1985 | Oshiro | ................... | B60H 1/244 |
| | | | | 454/165 |
| 4,646,864 A | 3/1987 | Racchi | | |
| 4,733,605 A * | 3/1988 | Holter | ................... | B01D 53/34 |
| | | | | 454/158 |
| 4,886,312 A * | 12/1989 | Asoh | ................... | B60J 1/1884 |
| | | | | 296/76 |
| 6,019,421 A * | 2/2000 | Roh | ................... | A47C 29/006 |
| | | | | 297/184.13 |
| 6,565,620 B1 * | 5/2003 | Greeson | ................ | B60K 13/02 |
| | | | | 123/198 E |
| 7,585,345 B2 * | 9/2009 | Smasal | ................. | B01D 45/08 |
| | | | | 55/443 |
| 7,686,384 B2 * | 3/2010 | Paul | ................... | B62D 35/007 |
| | | | | 296/180.5 |
| 2005/0000199 A1 * | 1/2005 | Carter | ................... | B01D 45/08 |
| | | | | 55/442 |
| 2008/0202083 A1 * | 8/2008 | Graham | ................ | B01D 45/06 |
| | | | | 55/444 |
| 2013/0052930 A1 | 2/2013 | Hofmann et al. | | |
| 2015/0087217 A1 | 3/2015 | Switzer et al. | | |
| 2015/0328566 A1 * | 11/2015 | Oosthuizen | ........ | B01D 46/0045 |
| | | | | 210/322 |
| 2015/0362196 A1 * | 12/2015 | Chen | ................... | F24C 15/2035 |
| | | | | 55/437 |

FOREIGN PATENT DOCUMENTS

| | | |
|---|---|---|
| DE | 40 06 208 | 8/1991 |
| DE | 10 2010 010 927 | 9/2011 |
| DE | 10 2012 109 321 | 4/2014 |
| WO | WO-9112974 A1 * | 9/1991 |

OTHER PUBLICATIONS

Great Britain Search and Examination Report dated May 7, 2019.
German Search Report dated May 24, 2018.

* cited by examiner

VEHICLE COMPONENT

CROSS REFERENCE TO RELATED APPLICATION

This application claims priority under 35 USC 119 to German Patent Appl. No. 10 2017 126 766.2 filed on Nov. 14, 2017, the entire disclosure of which is incorporated herein by reference.

BACKGROUND

Field of the Invention. The invention relates to a vehicle component having at least one lid and having at least one air duct opening, assigned to the lid, for letting in and/or letting out an air flow into or out of, respectively, an air duct.

Related Art. Motor vehicles typically are equipped with a fresh air intake for the interior to be ventilated, or for an air conditioning system to be supplied. For example, DE 40 06 208 A1 discloses a fresh air intake in which the fresh air is guided by way of an air duct that runs in an engine hood. The air flows in or out through large holes in the engine hood. These openings create an undesirable or unappealing view into internal regions of the engine hood. Additionally, these regions, often can be painted only with great complexity, if at all. Moreover, the result is very often an unappealing view onto windshield washer nozzles and lines and other components disposed there.

The unappealing view also makes a fresh air intake unacceptable for vehicles with a front trunk or baggage space. The overall visual impact also can be influenced unfavorably when the fresh air intake is combined with an engine hood of a high-end motor vehicle.

It is an object of the invention to improve the visual impact of an air duct opening in a lid while achieving the necessary air guiding in a space-saving manner.

SUMMARY

The invention relates to a lid, such as a front lid for closing a trunk. The lid comprises at least one air duct opening for accommodating an air flow into or out of an air duct. The air duct opening has at least one visual screen installation having at least two visual screen elements that are disposed sequentially and each visual screen element has at least one passage opening to delimit the air duct opening. The passage openings are offset so that a view into the air duct opening is restricted. Thus, an undesirable or unappealing view into the air duct opening is restricted significantly or even prevented. Moreover, the visual screen installation is not complex and can be installed easily in a small installation space.

The lid may comprise a front lid, such as a trunk lid. Thus, the lid may be configured for closing a trunk, such as a front trunk. However, the lid also can be an engine hood or another lid of a vehicle.

At least one visual screen element of the at least two visual screen elements may have at least one passage opening that is configured as a slot. The slot can be produced easily and offers a very effective visual screen paired with a correspondingly low flow resistance. The passage opening may comprise plural slots and all of the passage openings may be slots.

The passage openings may be elongate, such as elongate holes and/or rectangular and/or oval passage openings. The passage openings also can have other shapes, such as bores and/or round and/or angular passage openings. Plural slots or elongate passage openings may be parallel. The visual screen element and the associated passage opening may be configured in an integral manner. However, a design embodiment with multiple parts is possible.

At least one visual screen element of the at least two visual screen elements may have at least two passage openings. In particular, both visual screen elements or all of the visual screen elements may have plural passage openings. For example, each visual screen element may comprise three passage openings. Four or five or even ten or more passage openings can also be provided. Such design embodiments enable an effective visual screen of low complexity paired with a good throughflow capability.

All of the passage openings of a visual screen element may be offset in relation to the passage openings of the other visual screen element. The portions of a visual screen element that extend between the passage openings may be offset in relation to the portions of another visual screen element that extend between the passage openings. The portions are disposed sequentially so as to overlap.

Longitudinal axes of the passage openings in one embodiment are transverse to a longitudinal axis of the lid. This offers a very effective visual screen in in the case of an opened lid. The elongate passage openings and/or slots may have their longitudinal axes disposed transverse to the longitudinal axis of the lid. Another orientation of the passage openings is also possible. The longitudinal axis of the lid in the assembled position corresponds to a longitudinal axis or X-axis of the motor vehicle in relation to an assembly of the lid according to the intended operation.

The visual screen installation in one embodiment is suitable and configured for substantially preventing a view into the air duct opening and into the air duct opening when the lid is at an opening angle envisaged according to the intended operation. The opening angle may between 50° and 70° and preferably between 50° and 60°. The opening angle corresponds to a completely opened lid position, for example for unloading or loading, respectively. Other opening angles also are possible. The air duct opening thus is obscured reliably when a person stands in front of the opened lid and loads or unloads baggage, for example.

The view is prevented from a position of an observer in the intended operation and, for example, from a usual or standard eye level. The mutual spacing of the visual screen elements and/or the mutual offset of the passage openings may be adapted to the opening angle envisaged according to the intended operation.

At least one visual screen element of the at least two visual screen elements may comprise or consist of sheet-metal. Sheet metal offers a cost-effective production and an assembly of low complexity and an effective visual screen. Each visual screen element may be one sheet-metal part. However, plural visual screen element may be formed of a common component, such as a common sheet-metal part. Another material can also be provided. For example, the visual screen element can be fabricated from a plastics material.

The lid may comprise at least one external part and at least one internal part, and at least one air duct may run between the internal and external parts. This offers the air duct an accommodation that is particularly space-saving.

The external part may be an external skin and/or external cladding of the lid. The external part may be on an upper side of the lid. The internal part may be a lower side of the lid and may be on a lower side of the external part. The internal part and/or the external part may form at least one wall of the air duct.

The internal part may provide at least one first visual screen element. In particular, at least one reinforcement part may be between the internal part and the external part. The reinforcement part that is disposed between the internal part and the external part may provide at least one second visual screen element. The second visual screen element may be al least partly behind the first visual screen element. The reinforcement part is configured and disposed to increase the strength and/or the rigidity of the lid. The reinforcement part may be fastened to the internal part. However, the first and/or the second visual screen element may be provided by another component. It is possible for the internal part and/or the external part and/or the reinforcement part to be sheet-metal parts.

The air duct opening may be on a lower side of the lid. In particular, the air duct opening opens out on a lower side of the lid. The invention in such a design embodiment can provide a particularly good visual screen.

In one embodiment, plural air duct openings are provided. The plural air duct openings may comprise at least one inlet opening and/or at least one outlet opening. The inlet opening may be an inlet and/or the outlet opening be an outlet for the air duct. Thus, one air duct opening may be on each end of the air duct.

The inlet opening may be on a vehicle side that in the state assembled according to the intended operation of the vehicle component is envisaged as the driver side. In particular the outlet opening may be on a vehicle side that in the state assembled according to the intended operation of the vehicle component is envisaged as the passenger side. A reversed arrangement is also possible.

The inlet opening may be suitable and configured for receiving ambient air from a space, in particular a trunk, that extends below the lid. The outlet opening may be suitable and configured for being connected to at least one fresh air intake, in particular for an air conditioning system. The outlet opening may be coupled to an intake opening of the fresh air intake. In particular the outlet opening in the case of a closed lid may be connected and coupled fluidically to the fresh air intake. The fresh air intake functions to supply a passenger cabin and/or other vehicle regions with air. The inlet opening and/or the outlet opening can also be provided for other air flows.

The lid may be configured as a trunk lid such that the inlet opening opens into a trunk that is closable by way of the lid. The visual screen installation can be particularly advantageously for such a lid. The inlet opening may be suitable and configured for receiving ambient air from the trunk. The inlet opening preferably does not open into an engine bay, but may do so in some situations.

The motor vehicle may a passenger motor vehicle and may comprise at least one vehicle component as described above.

The motor vehicle may comprise at least one trunk that is disposed in the region of the front of the vehicle. An arrangement of the trunk in another vehicle region is also possible. The motor vehicle comprises in particular at least one fresh air intake for supplying a passenger cabin or the like. The motor vehicle also may comprise a rear-mounted engine and/or at least one mid-mounted engine. The engine can also be disposed at another location of the vehicle.

The visual screen installation comprises at least one first visual screen element and at least one second visual screen element that at least in portions is disposed behind the first visual screen element. The at least one passage opening of the first visual screen element is offset in relation to the at least one passage opening of the second visual screen element. The second visual screen element lies farther inside the air duct than the first visual screen element. Three, four or more visual screen elements can be provided.

The visual screen elements may be mutually spaced apart but also may contact one another at least in portions. The first and the second visual screen element may be in parallel planes. It is also possible for the visual screen elements to be disposed in an angled manner, or to be mutually inclined.

The passage openings may be offset so as not to overlap one another. In particular, the passage openings may be mutually offset in a spaced-apart manner. The passage openings in one embodiment are not in one line of alignment, but rather are offset in relation to an imaginary axis that runs transverse to a main plane of the ventilation opening and/or of the visual screen elements.

At least one visual screen element may have at least one passage opening. It is also possible for at least one visual screen element to have no passage opening. In such a design, the visual screen element may be at least one wall of the air duct and may delimit at least one passage opening.

The vehicle component comprises at least one air duct that runs at least partly in the lid. The air duct may be transverse to a longitudinal direction of the lid. The air duct can be provided by at least one transverse profile. The transverse profile may be between the external part and the internal part. The air duct may be suitable and configured for directing fresh intake air from an inlet opening to an outlet opening.

Further advantages and features of the invention are derived from the exemplary embodiment explained below with reference to the appended figures.

DETAILED DESCRIPTION

Figure 1:
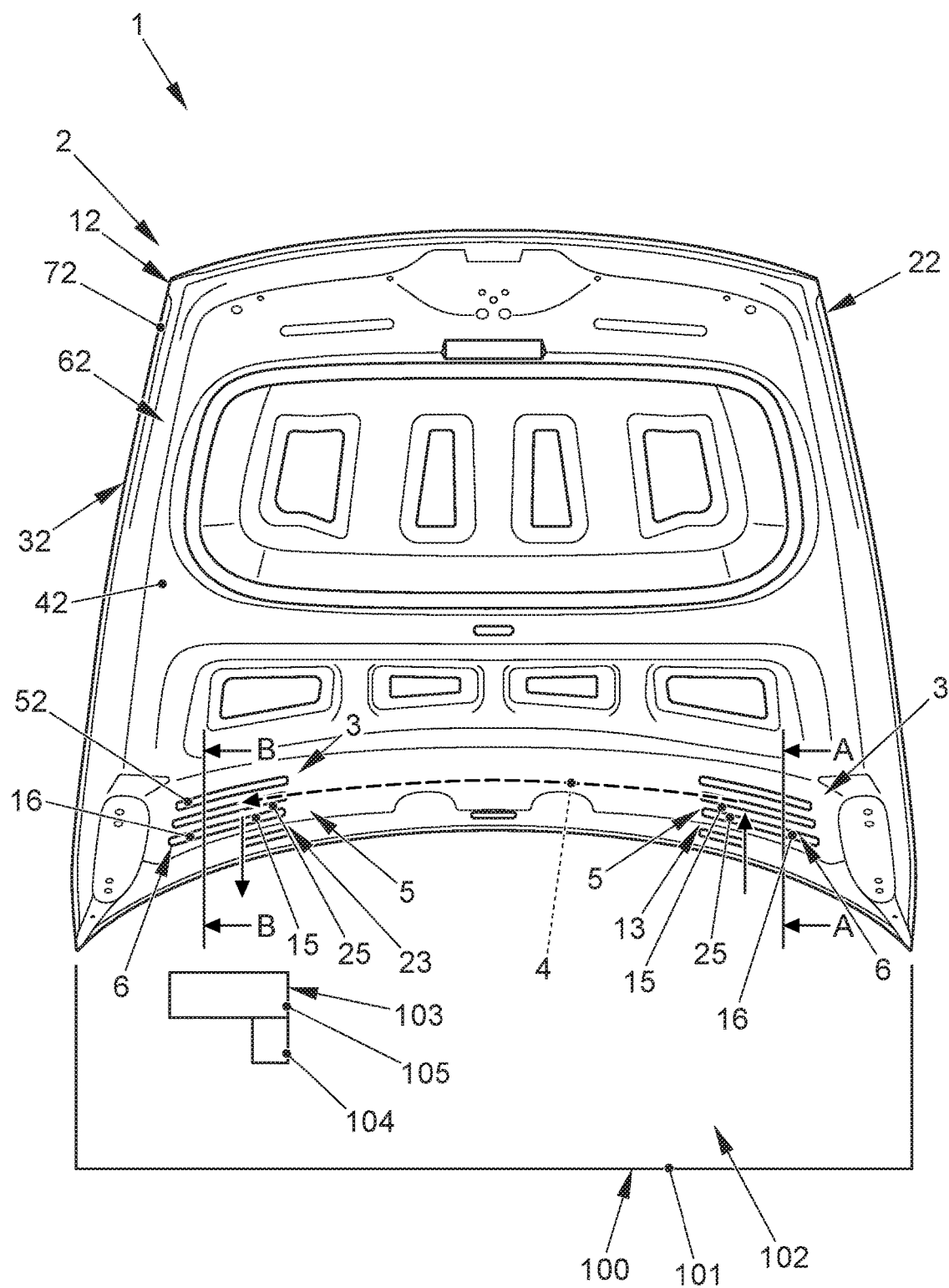
FIG. 1 is a schematic illustration of a vehicle component according to the invention, having a lifted lid, in a perspective view onto a lower side.

FIG. 1 shows a vehicle component 1 according to the invention. The vehicle component 1 is installed in a motor vehicle 100 that is configured as a passenger motor vehicle 101. The vehicle component 1 comprises a lid 2 configured as a front lid 12 and a trunk lid 72 and which is shown in an opened or lifted, respectively, position. A lower side 62 of the lid 2 and the components disposed there are thus readily identifiable. A trunk 102 of the motor vehicle 100 is below the lid 2, and the trunk 102 is illustrated in a highly schematic manner.

The lid 2 comprises an external part 32 that forms the external skin of the lid 2 and an internal part 42 that substantially provides the lower side 62.

An air duct 4 extends between the inner part 42 and the external part 32 and is equipped with two air duct openings 3. The air duct openings 3 open out on the lower side 62 of the lid 2. Thus, the air can enter the air duct 4 in the front lid 12 on a driver side of the motor vehicle 100 and can exit on a passenger side. The air duct 4 enables an overflow in a rearward transverse profile of the lid 2.

Figure 2:
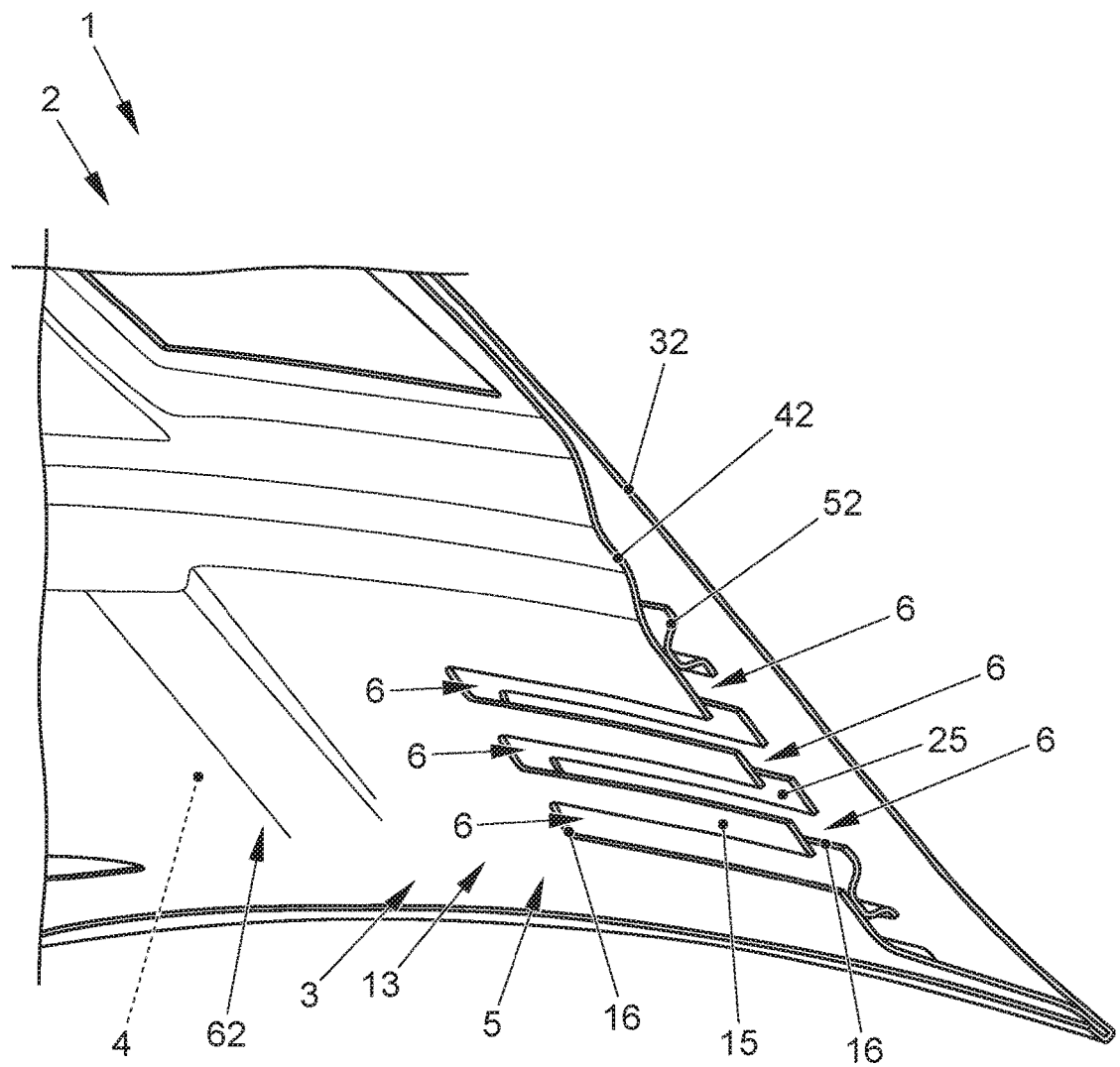
FIG. 2 is a schematic detailed view of the vehicle component of FIG. 1 in a perspective sectional illustration along the line A-A.
Figure 3:
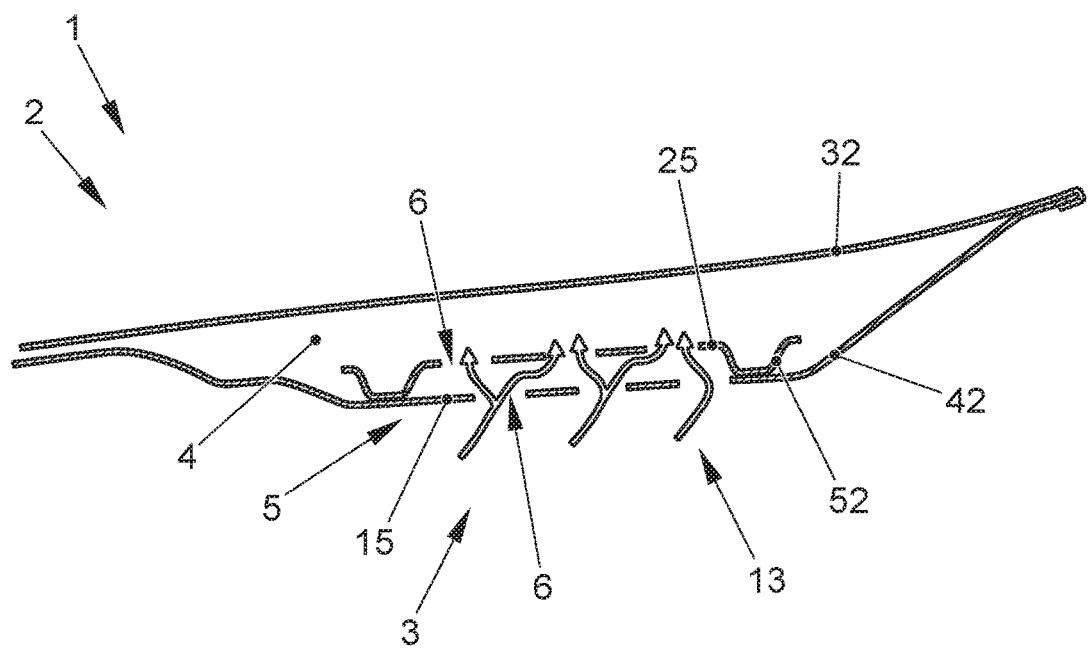
FIG. 3 is a schematic detailed view of the vehicle component of FIG. 1 in a sectional side view along the line A-A.
Figure 4:
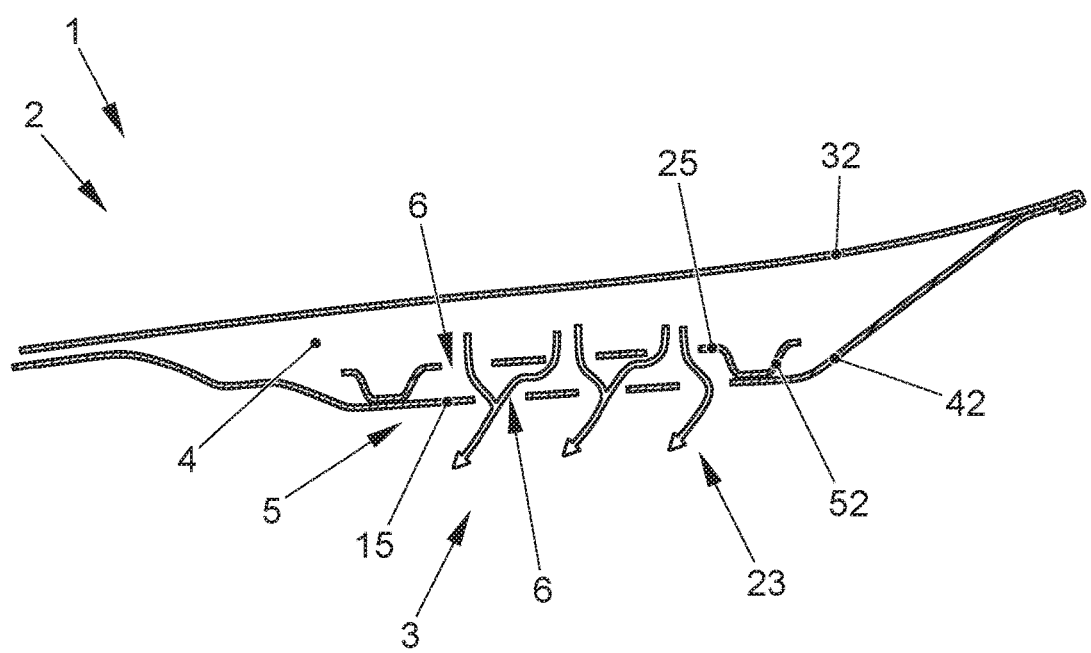
FIG. 4 shows a purely schematic detailed view of the vehicle component of FIG. 1 in a sectional side view along the line B-B.

The one air duct opening 3, which in FIG. 1 is disposed on the right and is illustrated in more detail in FIGS. 2 and 3, is configured as an inlet opening 13. The air duct opening 3 lets an air flow into the air duct 4. The other air duct opening 3, which in FIG. 1 is disposed on the left and is illustrated in more detail in FIG. 4 is configured as an outlet opening 23. This other air duct opening 3 lets the air flow out of the air duct 4.

The flow profiles in FIGS. 3 and 4 are indicated in a heavily schematic manner by arrows.

Ambient air from the trunk 102 is receivable by the inlet opening 13, flows through the air duct 4 and exits from the outlet opening 23. The outlet opening 23 is configured having a fresh air intake 103 for supplying, for example, a passenger cabin of the motor vehicle 100 with air. To this end the outlet opening 23 is disposed so that, in the case of a closed lid 2 and in the intended operation, communicates with an intake opening 105 of the fresh air intake 103. The fresh air intake 103 can then provide the air to an air conditioning system 104, for example.

A visual screen installation 5 is provided to prevent an unappealing view into the air duct opening 3 or into the air duct 4 in the case of an opened lid 2. The visual screen installation 5 prevents a view onto the internal regions of the lid 2 or the air duct 4. This is particularly advantageous since this region then does not have to be painted and often is equipped with windshield washer nozzles or lines and/or other components.

The visual screen installation 5 for the two air duct openings 3 comprises in each case two sequentially disposed visual screen elements 15, 25. Each of the visual screen elements 15, 25 shown here delimits the associated air duct opening 3 with the exception of in each case, for example, three passage openings 6. The passage openings 6 are slots, and one slot 16 is incorporated in the associated visual screen element 15, 25 for each passage opening 6. Despite the visual screen, the desired air flow can enter or exit the air duct 4 without impediment.

The passage openings 6 of communication visual screen elements 15, 25 are mutually offset so that the view into the air duct opening 3 is prevented or is restricted significantly.

The passage openings 6 or slots 16 have longitudinal axes that are transverse to a longitudinal axis of the lid 2. The longitudinal axis runs from a rear lateral edge of the lid 2 to a front lateral edge of the lid 2 and corresponds to a longitudinal axis or X-axis of the motor vehicle 100. The longitudinal axes of the passage openings 6 are thus transverse to the longitudinal axis of the motor vehicle 100 and provide a particularly good visual screen effect with an opened lid 2.

The visual screen element 5 is configured such that a view into the air duct opening 3 is restricted significantly when the lid 2 is at an opening angle 22 that is provided according to the intended operation. The visual screen herein relates to a view from the front, or from a forward region of the motor vehicle 100 such as is assumed, for example, when loading or unloading. For example, the perspective view shown in FIG. 1 from the front onto the opened lid 2 corresponds to a view expected by an observer.

For example, an opening angle 22 as is shown in FIG. 1 and as arises in the case of an opened lid 2 is envisaged. In this instance, no unappealing view into the air duct opening 3 arises, for example when loading or unloading the trunk 102. An opening angle 22 between 60° and 65° is envisaged here, for example. Such an opening angle 22 corresponds to a normal or usual, respectively, lifted position of a front lid 12 that serves as a trunk lid 72. Other opening angles 22 are also possible.

Adapting the visual screen effect to an envisaged opening angle 22 can be performed, for example, by way of the mutual spacing of the two visual screen elements 15, 25 and/or by way of the mutual offset of the passage openings 6.

The forward or first visual screen element 15 is provided by the internal part 42. To this end, the internal part 42 is equipped with corresponding passage openings 6. The rearward or second visual screen element 25 is provided by a reinforcement part 52. The reinforcement part 52 is disposed between the internal part 32 and the external part 42 and increases the strength or the rigidity of the lid 2. The reinforcement part 52 is equipped with passage openings 6 that are offset in relation to the passage openings 6 of the first visual screen element 15.

In one embodiment, the external part 32 and/or the internal part 42 and/or the reinforcement part 52 are or comprise sheet-metal parts.

LIST OF REFERENCE SIGNS

1 Vehicle component
2 Lid
3 Air duct opening
4 Air duct
5 Visual screen installation
6 Passage opening
12 Front lid
13 Inlet opening
15 Visual screen element
16 Slot
22 Opening angle
23 Outlet opening
25 Visual screen element
32 External part
42 Internal part
52 Reinforcement part
62 Lower side
72 Trunk lid
100 Motor vehicle
101 Passenger motor vehicle
102 Trunk
103 Fresh air intake
104 Air conditioning system
105 Intake opening

What is claimed is:

1. A vehicle component, comprising: at least one lid for closing a trunk, and having at least one air duct opening assigned to the lid for letting in and/or letting out an air flow into or out of an air duct, the at least one air duct opening being equipped with at least one visual screen installation that delimits the at least one air duct opening, the at least one visual screen installation having at least first and second visual screen elements that are disposed sequentially and each of the visual screen elements having at least one passage opening, the at least one passage opening in the first visual screen element being offset from the at least one passage opening in the second visual screen element so that a view into the at least one air duct opening is restricted, wherein the lid comprises at least one external part and at least one internal part and the air duct is between the internal part and the external part, and wherein the second visual screen element is disposed between the internal part and the external part and wherein the second visual screen element includes at least one reinforcement part.

2. The vehicle component of claim 1, wherein the at least one first air passage opening is a slot.

3. The vehicle component of claim 1, wherein the at least one first air passage opening comprises plural first air passage openings and the at least one second air passage opening comprises plural second air passage openings.

4. The vehicle component of claim 1, wherein each of the first air passage openings is disposed transverse to a longitudinal axis of the lid.

5. The vehicle component of claim 1, wherein the first and second air passage openings are configured for preventing a view into the air duct opening when the lid is in an opened position.

6. The vehicle component of claim 5, wherein the first and second air passage openings are configured for preventing a view into the air duct opening when the lid is at an opening angle of between 55° and 70°.

7. The vehicle component of claim 1, wherein at least one of the first and second visual screen elements is a sheet-metal part.

8. The vehicle component of claim 1, wherein the at least one first air passage opening is on a lower side of the lid.

9. The vehicle component of claim 1, wherein the at least one first air passage opening comprises at least one inlet opening and at least one outlet opening in the internal part, and the at least one visual screen installation comprises an inlet visual screen mounted at the at least one inlet opening and an outlet visual screen mounted at the at least one outlet opening.

10. The vehicle component of claim 9, wherein the inlet opening is configured for receiving ambient air from a space that extends below the lid and wherein the outlet opening is configured for being connected to at least one fresh air intake for an air conditioning system.

11. The vehicle component of claim 9, wherein the lid is a trunk lid and the inlet opening opens into a trunk that is closable by the lid.

* * * * *